United States Patent [19]

Bacardit

[11] Patent Number: 4,665,797
[45] Date of Patent: May 19, 1987

[54] HYDRAULIC DISTRIBUTOR FOR A SERVOMECHANISM WITH REACTION ON THE INPUT COMPONENT

[75] Inventor: Juan S. Bacardit, Barcelona, Spain
[73] Assignee: Bendiberica S.A., Barcelona, Spain
[21] Appl. No.: 550,341
[22] Filed: Nov. 9, 1983
[30] Foreign Application Priority Data
Nov. 13, 1982 [ES] Spain .................................... 517.365
[51] Int. Cl.[4] ............................................. F15B 9/10
[52] U.S. Cl. ...................................... 91/370; 91/434; 137/625.21; 180/132
[58] Field of Search .................. 91/370, 434, 371, 372, 91/373; 137/625.21; 180/132

[56] References Cited

U.S. PATENT DOCUMENTS

| | | | |
|---|---|---|---|
| 4,320,780 | 3/1982 | Bacardit | 91/434 |
| 4,335,749 | 6/1982 | Walter | 91/372 |
| 4,369,695 | 1/1983 | Nishikawa et al. | 137/625.21 |
| 4,459,896 | 7/1984 | Dauvergne et al. | 137/625.21 |

Primary Examiner—Edward K. Look
Attorney, Agent, or Firm—Larry J. Palguta; Ken C. Decker

[57] ABSTRACT

The distributor (10, 11), typically with a star-type rotor in a discoid stator, incorporates a valve means with an OR logic function (5, 5') of preselection of the direction of the reaction (22, 23) to be applied to the input component as a function of the relative displacement between the primary and secondary components of the distributor, formed in one piece with the distributor and consisting of pairs of edges cooperating between two cavities (39a, 39b) of the stator (28, 30) and a cavity (44) of the rotor (31) advantageously formed in a reaction arm (41) of this rotor and permanently communicating with the source of pressure (14) of the distributor via a restriction (4) which can be externally modulated. The restrictions (5, 5') providing the OR logic function come into operation first, before the actual distribution restrictions (1, 2, 3; 1', 2', 3') of the distributor supplying the assistance actuator (19).

9 Claims, 15 Drawing Figures

FIG_5

FIG_6

FIG_7

FIG_8

FIG_9

FIG_10

FIG_11

FIG_12

FIG_13

FIG.14

FIG_15

HYDRAULIC DISTRIBUTOR FOR A SERVOMECHANISM WITH REACTION ON THE INPUT COMPONENT

The present invention concerns hydraulic distributors for servomechanisms, particularly for assisted steering of vehicles, and more especially the hydraulic distributors of the type incorporating a primary component and a secondary component mutually defining distribution valve means between a source of pressure and a drain for an assistance device, and associated through the intermediary of a coupling with a deal travel zone allowing a limited relative displacement between the primary and secondary components about a central position, the primary component being joined to an input actuating component of the distributor, and to a reaction device with opposed chambers operated hydraulically by reaction pressures supplied, from a source of pressure, by a valve means with an OR logic function for preselecting the direction of the reaction to be applied as a function of the relative displacement between the primary and secondary components of the distributor. Such a hydraulic distributor is described in U.S. Pat. No. 4,512,238.

The OR function generally takes the form, in practice, of a valve means with electromagnetic switching controlled by logic control circuits, existing on certain vehicles at the present time, or by a simple command executed by the driver. In all cases, the valve occupies a certain additional space, requires the installation of connecting pipework and requires a certain mounting time.

The aim of the present invention is to improve this type of hydraulic distributor by incorporating the OR function valve means in the distributor itself and making it independent of the working cavities of the distributor, which enables the need for an external switching valve to be eliminated together with the installation pipework which connects it to the hydraulic distributor, and thus enables, in particular, the installation work and maintenance to be simplified while increasing the reliability and the opportunities for application of the system.

For this purpose, according to a characteristic of the present invention, the OR function valve means consists of pairs of opposed cooperating edges defined, firstly, by two first cavities spaced from one another in the direction of relative displacement between the primary and secondary components, formed in the working surface of one of these primary and secondary components and communicating in parallel with the drain and both sides of the reaction device, and secondly, by a third cavity formed in the working surface of the other of the primary and secondary components, between the two first cavities and permanently communicating with a source of reaction pressure.

In a preferred embodiment of the invention, the two first cavities are formed in the working surfaces of the rotor or of the stator of a hydraulic distributor with a star type rotor, and the third cavity is formed on the working surface which is complementary to the previous working surface of the stator or of the rotor of the distributor in question.

According to a more particular characteristic, each first cavity communicates with a corresponding reaction chamber of the reaction device incorporated in the distributor itself.

Although it is possible to construct distributors which reflect the characteristics mentioned above, of the type known as "closed center", the improvements of the present invention are more particularly suitable for distributor systems of the "open centre" type, that is to say, where the ends of the third cavity described above slightly overlap the ends of the two first cavities in the central rest position of the distributor, while, during the operation of the latter, this overlap is reduced over one of the ends of the third cavity and increased over the other end until the amplitude reached corresponds to the maximum relative displacement of the two components of the distributor.

The accompanying drawings show, by way of examples which do not limit the scope of the present invention and in diagrammatic illustrations, certain preferred practical embodiments of the invention. In these drawings.

In the following description, and in the drawings, similar or identical components carry the same reference numbers.

Figure 1:
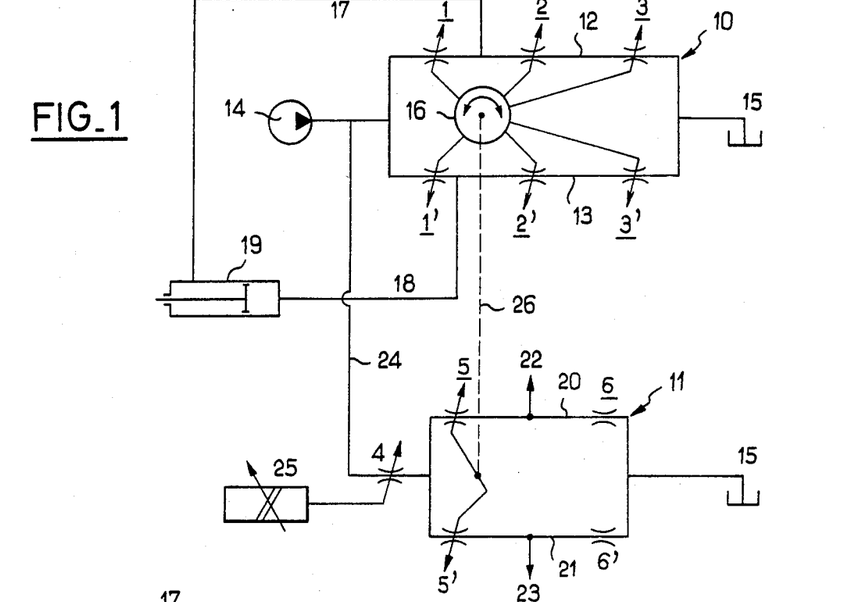
FIG. 1 is a diagram of a first embodiment of a hydraulic distributor according to the invention.

FIG. 1 shows the operational diagram of a first embodiment of a distributor for steering mechanisms with hydraulic assistance for motor vehicles according to the invention, which in practice can be made in various known forms of construction, such as, for example, devices with independent valves of the type with a coaxial grooved rotor and stator, or preferably, a discoid distributor with a star type rotor, as described, for example, in Patent Application No. EP-A-0,021,970 in the name of the Applicant Company.

The distributor shown in FIG. 1 comprises essentially two units 10 and 11, corresponding, respectively, to the actual distributor and to a combination of an OR function valve means and a reaction regulating device, incorporated in the same distributor body in accordance with the invention, as is described later.

The distributor unit 10 incorporates two parallel circuits 12 and 13 in which throttles or variable restrictions 1, 2 and 3, 1', 2' and 3', respectively, are interposed in series. The two circuits run between a source of hydraulic liquid under pressure 14 and a reservoir of drain 15. The restrictions are operated simultaneously by components appropriate to each case, from the movable control component of the distributor, indicated by the reference 16. Conduits 17 and 18 branch, respectively, from between the restrictions 1 and 2, 1' and 2' of each circuit 12 and 13, and terminate in the opposing chambers of a double acting assistance actuator, represented by the cylinder 19 and which can take any of the usual forms used in practice, such as, for example, a simple cylinder, or a screw piston unit operating in a cylinder formed in a steering box, for example.

The unit 11 itself incorporates two other distinct parallel circuits 20 and 21 each provided with two restrictions in series 5, 6 and 5', 6', respectively, from between which the conduits 22 and 23 branch, which lead to the opposed chambers of a double acting reaction actuator, such as, for example, the two chambers situated on both sides of a reaction rotor arm of a distributor with a star type rotor. The pressure of the source 14 is conveyed to the unit 11 through the conduit 24 in which a variable restriction device 4 is interposed, controlled externally, for example, by means of an electromagnetic actuator 25, controlled by electronic devices for controlling motion and steering, with which certain vehicles are equipped at the present time; the exhaust is likewise conveyed towards the drain 15. The actuation of the upstream variable restrictions 5 and 5' is provided from the movable control component 16 of the distributor by means appropriate to each case which are shown conventionally by the line 26. These two restrictions together form a valve with an OR function, which, in an initial phase of operation of the distributor, selects the direction of application of the reaction force onto the steering mechanism, then regulates the amplitude of these reaction forces so as to match the behavior to certain standards established beforehand.

Figure 2:
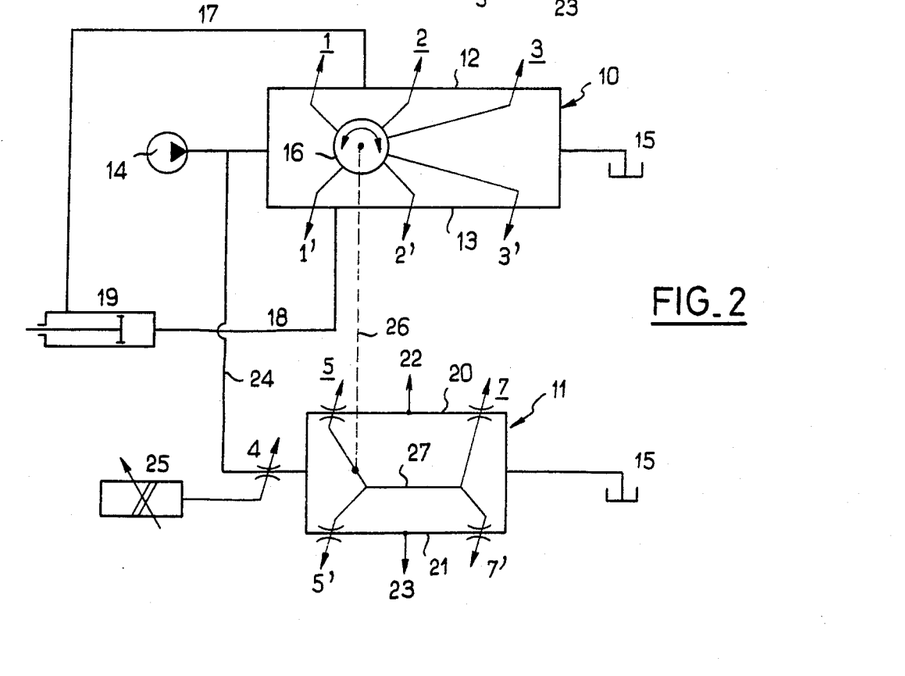
FIG. 2 is a similar diagram of another embodiment of the invention.

The embodiment shown in FIG. 2, in which identical or similar components are designated by the same reference numbers, differs from the previous case in that the downstream restrictions 7 and 7' replace the fixed restrictions 6 and 6', and are also modulated and actuated simultaneously with the restrictions 5 and 5', by the intermediary of the control shown at 27.

Figure 3:
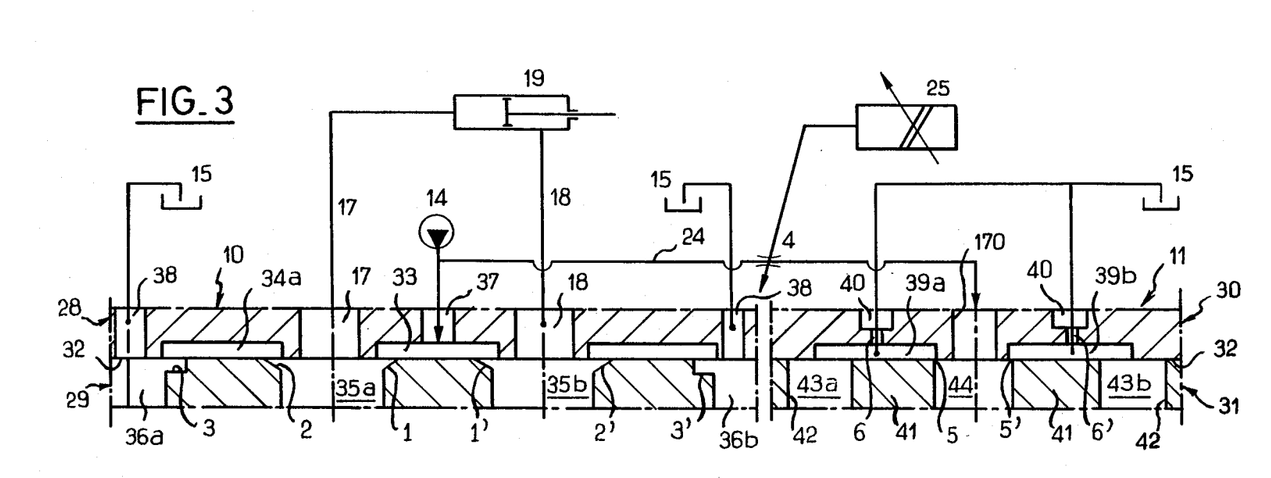
FIGS. 3, 4 and 5 are developed partial views of a rotary star type distributor of the open center type, corresponding to the diagram in FIG. 1 and showing, respectively, the central rest position and two distinct operating positions of the said distributor.

The two distributors described are preferably of the type of distributor with a star type rotor. The first case is shown in FIG. 3 in which is shown in developed form a portion of the discoid stator of the distributor indicated by the reference number 28, which incorporates the components of the unit 10 shown in FIG. 1, and a portion of the stator 30 which incorporates the components of the unit 11. The corresponding portions of the rotor 29 and 31 are positioned opposite these portions of the stator.

On the portion of the stator 28, the working surface defined by the interface plane 32 incorporates an input cavity 33 flanked by two distribution cavities 34a and 34b, and on the adjacent portion of the rotor 29, whose working surface also coincides with the plane 32, a pair of working cavities 35a and 35b is formed situated either side of the input cavity 33 of the stator together with two drain cavities 36a and 36b situated beyond the working cavities in both directions relative to the input cavity 33. The input cavity 33 is connected to the conduit 37 coming from the source of pressure 14; the two working cavities 35a, 35b are connected, by the respective conduits 17 and 18, to the two ends of the assistance actuator 19, while the drain cavities 36a, 36b are connected by conduits 38 to the drain 15.

The portions of the stator 30 and of the rotor 31 also incorporate working surfaces arranged to coincide with the interface plane 32. The input conduit 24 for reaction pressure, externally modulated by the variable restriction 4, opens into the interface through an input opening 170 formed in the portion of the stator 30 while the surface of the stator is provided, both sides of this opening 170, with two reaction cavities 39a and 39b from which the conduits 40 branch, which terminate at the drain 15. The portion 31 of the rotor forms a reaction arm 41 located in a reaction cavity 42 of the stator so as to define inside the latter two reaction chambers 43a and 43b each side of the arm 41. In the rest position, the arm 41 is centered over the group of the two reaction cavities 39a and 39b and its outer edges are well separated from the opposite ends of these cavities, so that they communicate freely with the reaction chambers 43a and 43b, respectively. In this case, the fixed restrictions 6 and 6' consist of calibrated passages, designated by the same reference numbers, in the ports of the drain conduits 40 in the stator 30. The reaction arm 41 is provided with a central window 44 which, in the rest position, overlaps very slightly the adjacent ends of the reaction cavities 39a and 39b.

Figure 6:
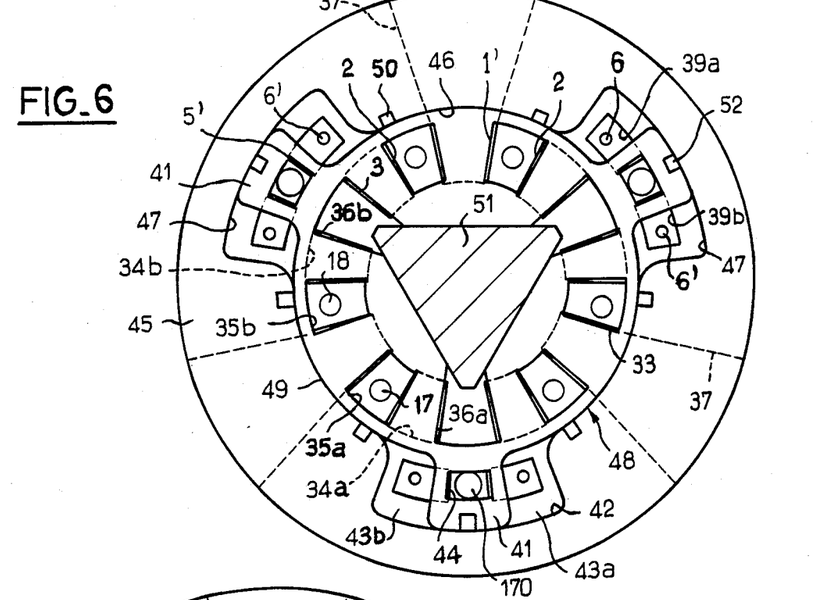
FIGS. 6, 7 and 8 are diagrammatic front views of the practical embodiment of a distributor in accordance with FIGS. 3 to 5, with the front stator cover removed, in positions corresponding to those in FIGS. 3 to 5.

FIG. 6 shows the practical embodiment of a distributor of this type, shown in the form of a discoid valve with a star type rotor.

The stator consists of a disc 45 provided with a central opening which incorporates three portions of a common cylindrical surface 46 and three portions of a common cylindrical surface 47 of a radius greater than that of the first portoins and alternated between the portions 46. A star type rotor, designated by the general reference 48, is mounted in this opening so as to perform a limited rotary movement. This rotor incorporates three principal portions of a cylindrical surface 49 which are arranged so as to slide and to be sealed against the portions 46 of the stator by the intermediary of seals 50. These portions 49 are separated by three radial arms 41 which are the same as those indicated by this reference number in FIG. 3.

The rotor 48 is coupled for its rotary actuation to a triangular shaft 51 which receives its driving impulse from the actuating input component, typically a steering wheel. The stator is closed on its two axial surfaces, each side of the rotor, by covers, not shown in FIG. 6 but forming the stator portions 28 and 30, through which only the shaft 51 passes. The latter is joined, by a coupling having a dead travel zone, to the output shaft of the distributor which terminates at the steering mechanism. The rotor arms are arranged so as to slide and to be sealed on the surfaces 47 of the stator by the intermediary of seals 52.

The various reference numbers of FIG. 3 have been transferred to corresponding parts shown in FIG. 6. Thus it may be seen that the incoming conduits for fluid under pressure 37 consist of radial grooves on the faces of the stator or of its covers, which open directly into the input cavities 33 while the cavities of the rotor portion 29 shown in FIG. 3 (35a, 35b and 36a, 36b) consist of windows which pass through the rotor disc 48 shown in FIG. 6. These valve components, centered relative to the portions of the cylindrical surface 46 of the stator, correspond, as may be seen, to the stator portion 28 and the rotor portion 29 shown in FIG. 3. In the same way, the valve components described relating to the stator portion 30 and the rotor portion 31 shown in FIG. 3 are constructed to correspond with the arms 41 of the rotor, as may be seen according to the corresponding reference numbers, also used in FIG. 6.

The operation of the hydraulic distributor described is as follows:

FIGS. 3 and 6 show the system in the central rest position and the operation which corresponds to the control of the servo-steering will be distinguished from the operation which corresponds to the regulation of the reaction.

In the first case, the fluid under pressure arriving through the conduit 37 is distributed proportionally on both sides of the input cavity 33, passing firstly through the restrictions 1, 2 and 3 towards the drain cavity 36a and the drain conduit 38, and also secondly, through restrictions 1', 2' and 3' towards the drain cavity 36b and the other drain conduit 38; the working cavities 35a and 35b are at equal pressures and the assistance actuator 19 remains inactive, centered at a rest position by the reactions deriving from the controlled (steering) mechanism during the motion of the vehicle. In the second case, two parallel paths are formed, which, from the variable restriction 4, from the input opening 170 and from the window 44 of the rotor, divide symmetrically towards the drain 15, passing firstly through the restrictions 5 and 6, and secondly through the restrictions 5' and 6', so that the reaction cavities 39a and 39b are maintained at the same pressure, in the same way as the chambers 43a and 43b, without applying any reaction to the arm 41 of the rotor. This phase of operation is shown in FIGS. 3 and 6, and, on the characteristic shown in FIG. 9, corresponds to the origin 0.

When the steering wheel is turned, a movement of the rotor relative to the stator is produced, in a certain direction from the central rest position described above; let us suppose for example, that the rotor 48 (29 and 31 in FIG. 3) is displaced to the right relative to the stator 45 (28 and 30 in FIG. 3).

Figure 4:
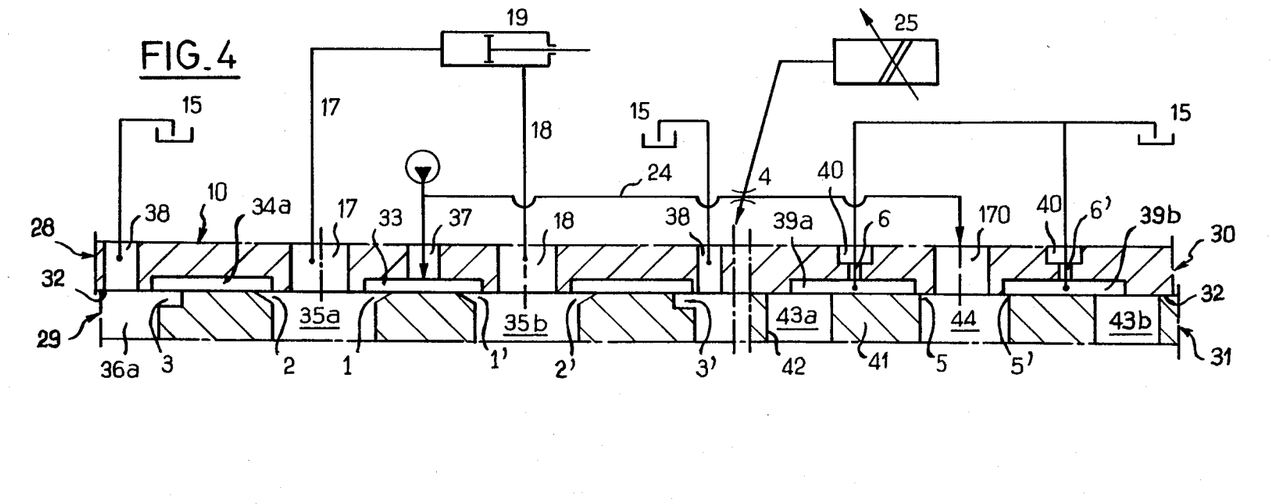
Figure 7:
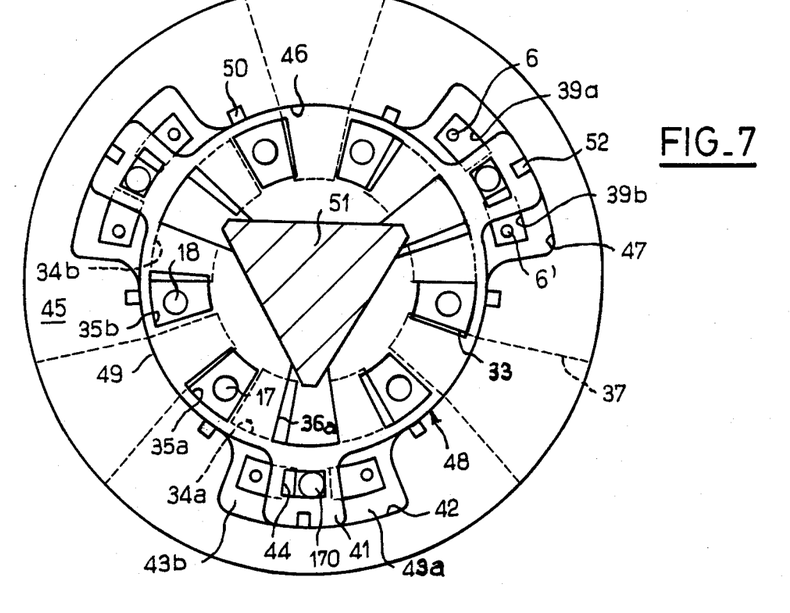

The arrangement is then such (FIGS. 4 and 7) that the restriction 5 of the unit 11 (FIGS. 1 and 3) closes initially, so as to select automatically the direction of reaction to the left, given that, on the one hand, the chambers 39a and 43a, isolated from the input window 44, are maintained at the pressure of the drain conduit 40, while the increase in flow caused by the enlargement of the restriction 5' causes, under the effect of the fixed restriction 6', the pressure in the cavity 39b to increase, and hence that in the reaction chamber 43b. If the rotation continues a little further, the restrictions 2 and 3' then become operational. The first of these introduces a restriction which reduces linearly the cross-section of the passage while the second introduces a fixed restriction from this instant; at this precise moment, the cross-sections of the passages formed by the two restrictions are equal, which causes a uniform increase of pressures in the chambers 35b, 33, 35a and 34b and consequently on both sides of the assistance actuator 19 which, as a result, carries out no work. This operation is represented on the horizontal portion 0-1 of the characteristic shown in FIG. 9 (known as the "central" operation of the system).

Figure 5:
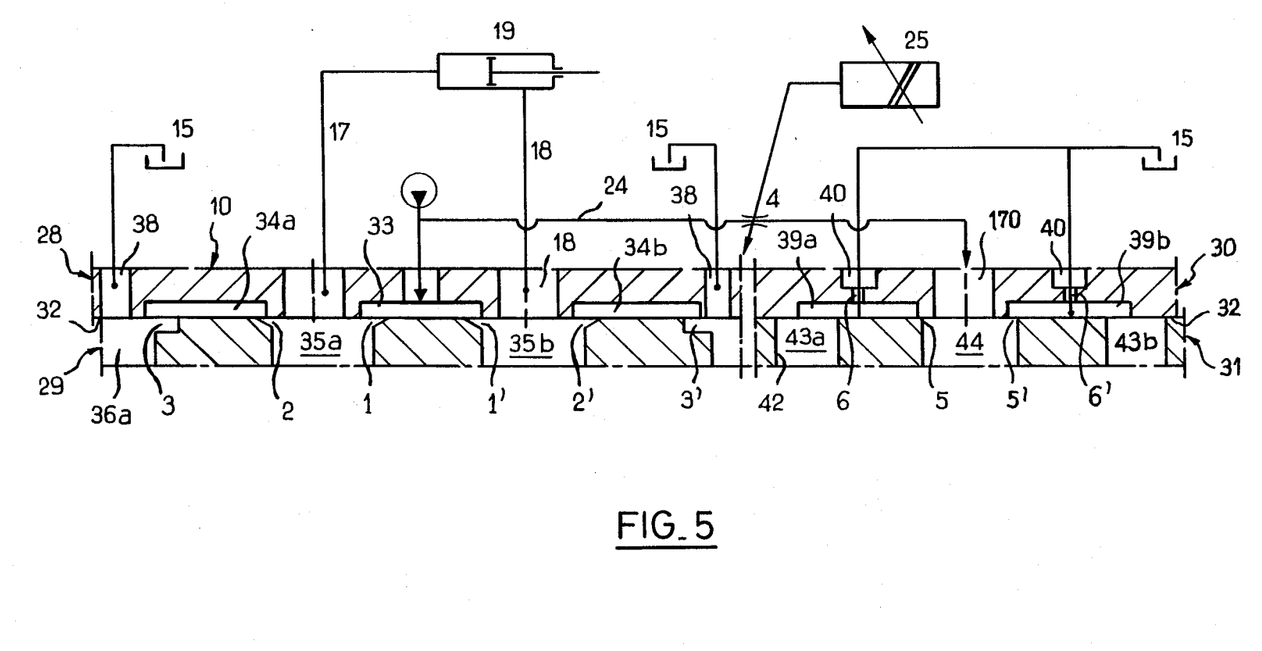
Figure 8:
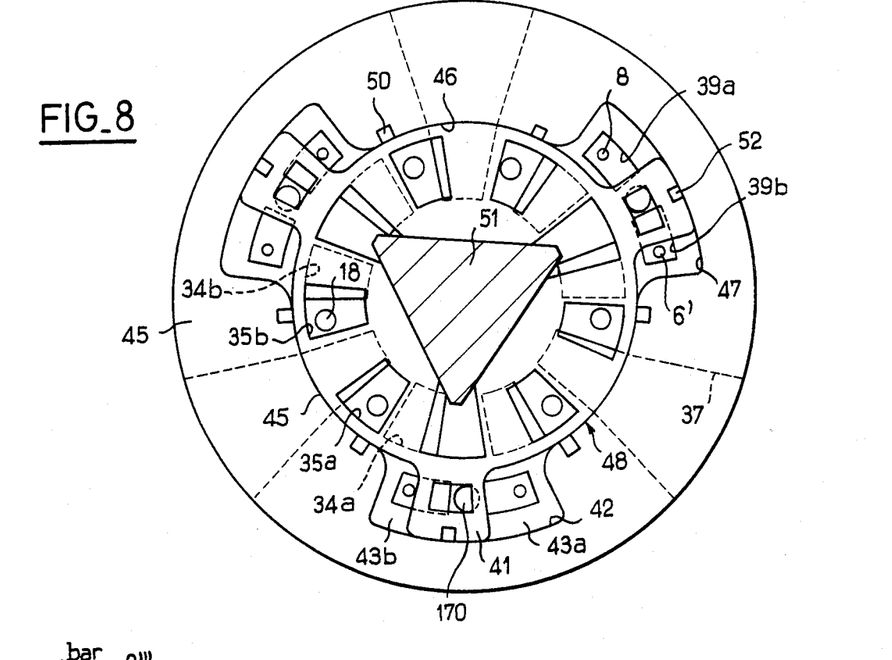

Further rotational movement brings the restriction 1' into operation, which creates, between the chambers 35a and 35b, a differential pressure, transmitted to the actuator 19 through conduits 17 and 18 so as to commence the corresponding assistance movement. On the other hand, given that the fluid necessary to produce the reaction pressure, coming from the input conduit 170, in the window 44, always provides a pressure proportional to the differential pressure which actuates the cylinder 19, the applied reaction force is also proportional to this differential pressure. This phase of operation is that represented in FIGS. 5 and 8 and in section 1-2 of the characteristic shown in FIG. 9.

Figure 9:
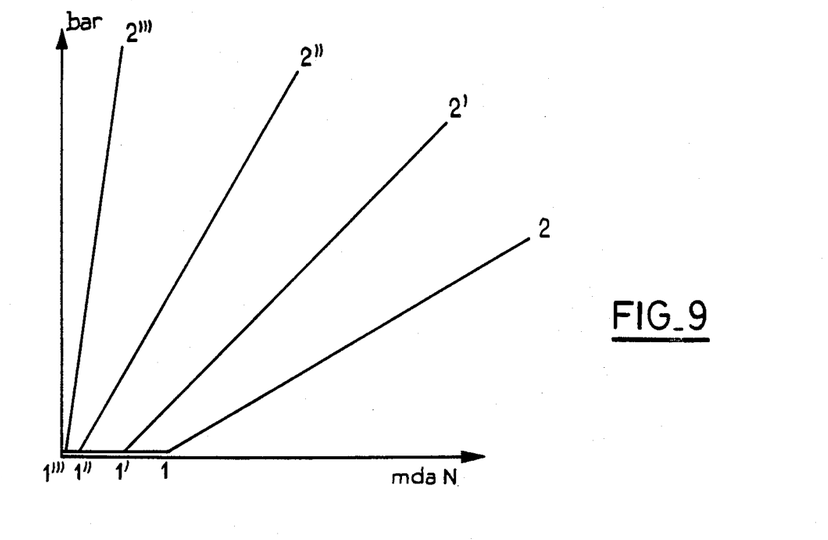
FIG. 9 shows the operating characteristic of the distributor.

So far we have assumed that the restriction 4 has been kept fully open and had not moved from this position during the whole of the operation described, so that the distributor provided a zero point corresponding to the section 0-1 and a characteristic of assistance pressure 1-2 with a reaction pressure proportional to the differential assistance pressure. If, however, the restriction 4 is more or less closed so as to supply to the reaction unit 11 different flow of lesser magnitude, the input pressure of the unit 10 consequently increases, together with the differential assistance pressure, that is to say that we now have an assistance pressure for a smaller actuating torque. In other words, if the position of the restriction 4 is modulated, it is possible to obtain any other characteristic situated in the left hand zone of the curve 0-1-2, as indicated, for example, by the profiles 0-1'-2', 0-1''-2'', etc.

This operation is obviously identical, but reversed, when the distributor is operated in the direction opposite to that described.

In the embodiment shown in FIG. 2, the variable restrictions designated in this Figure by the reference numbers 7 and 7', replacing the fixed restrictions 6 and 6' shown in FIG. 1, can be modulated as a function of the movement of the distributor rotor, as shown symbolically by the control 27. The aim of this variant is to eliminate noise which, in practice, is produced during the passage of the hydraulic fluid through the fixed narrow restrictions 6 and 6'. It will emerge more clearly from the following description.

Figure 10:
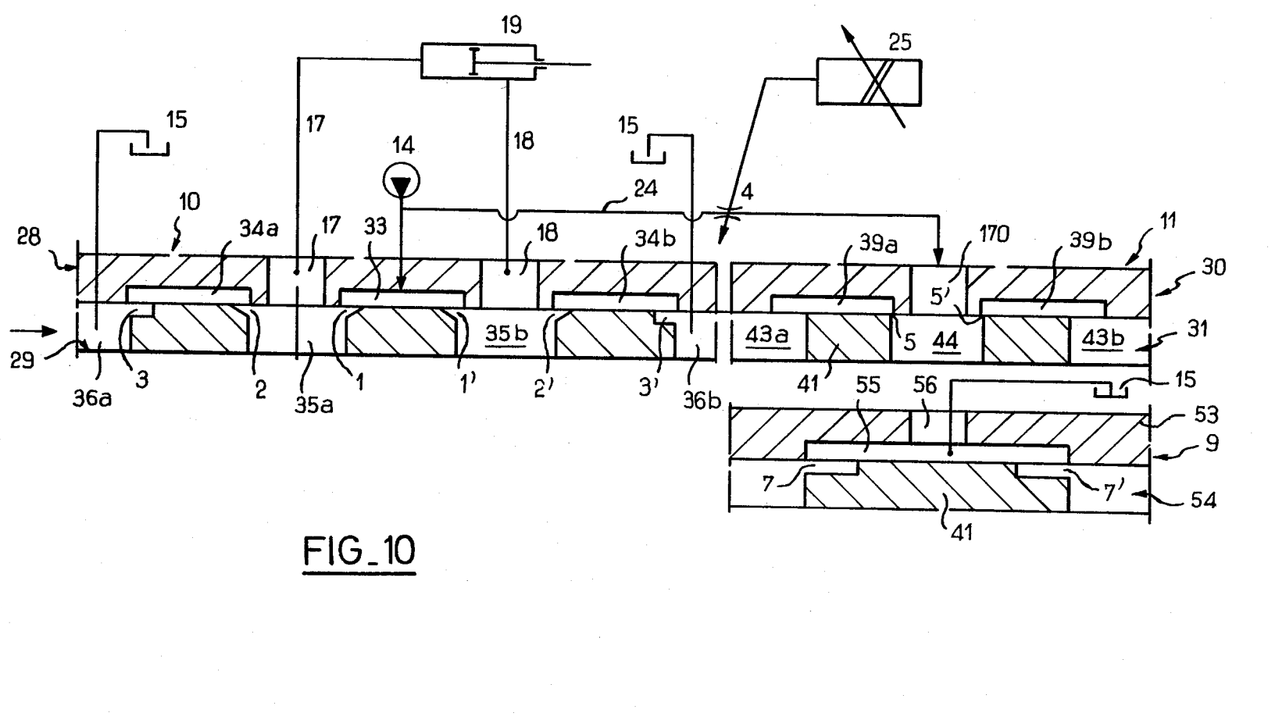
FIGS. 10, 11 and 12 are developed partial views of a rotary star type distributor of the open centre type corresponding to the diagram in FIG. 2, and which show, respectively, the central rest position and two distinct operating positions of the said distributor.
Figure 11:
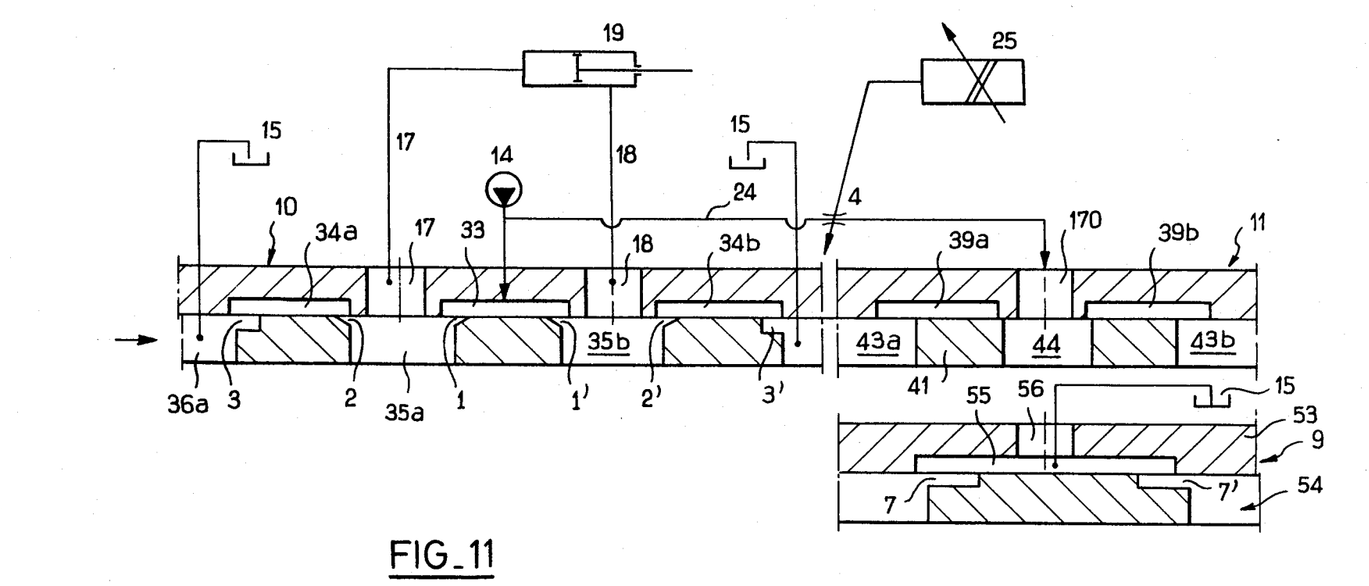
Figure 12:
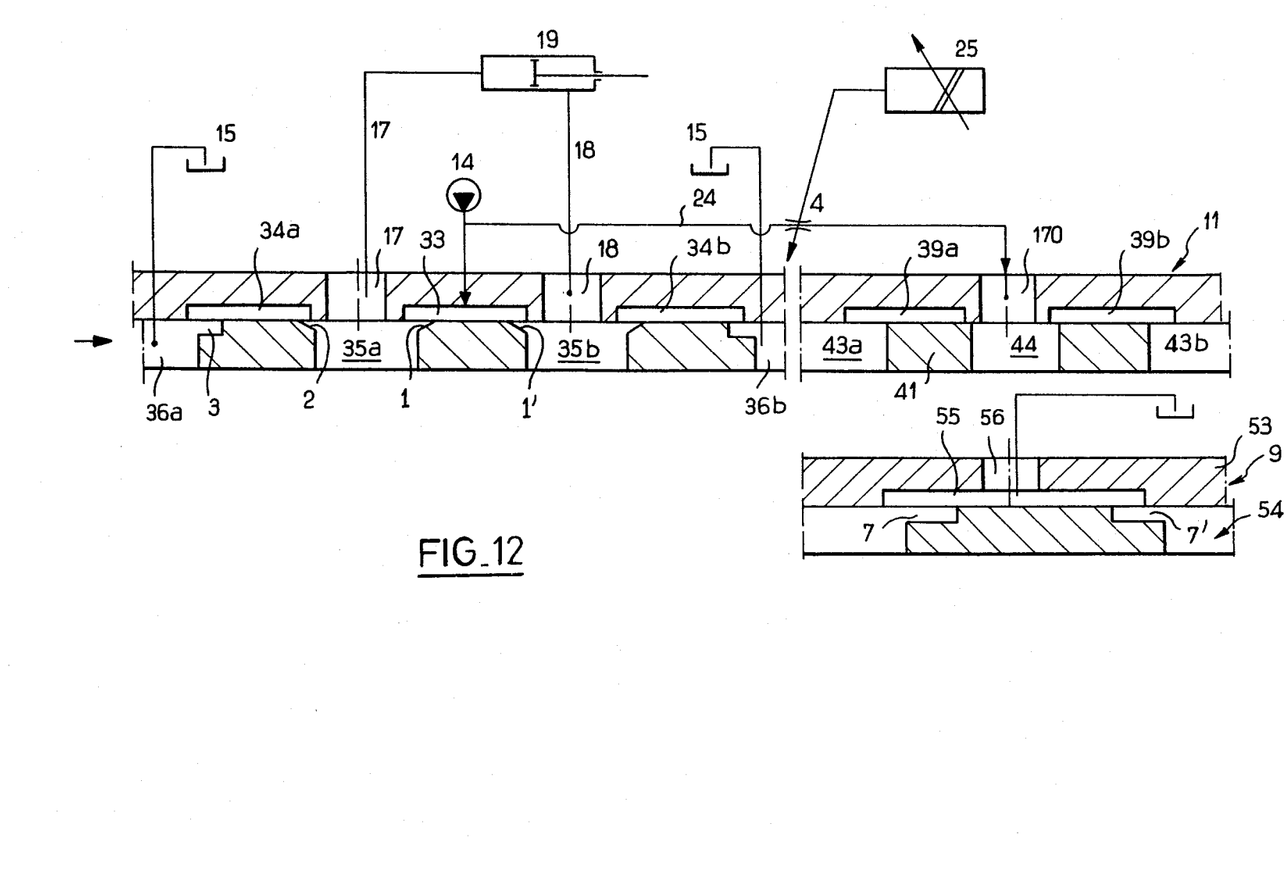
Figure 13:
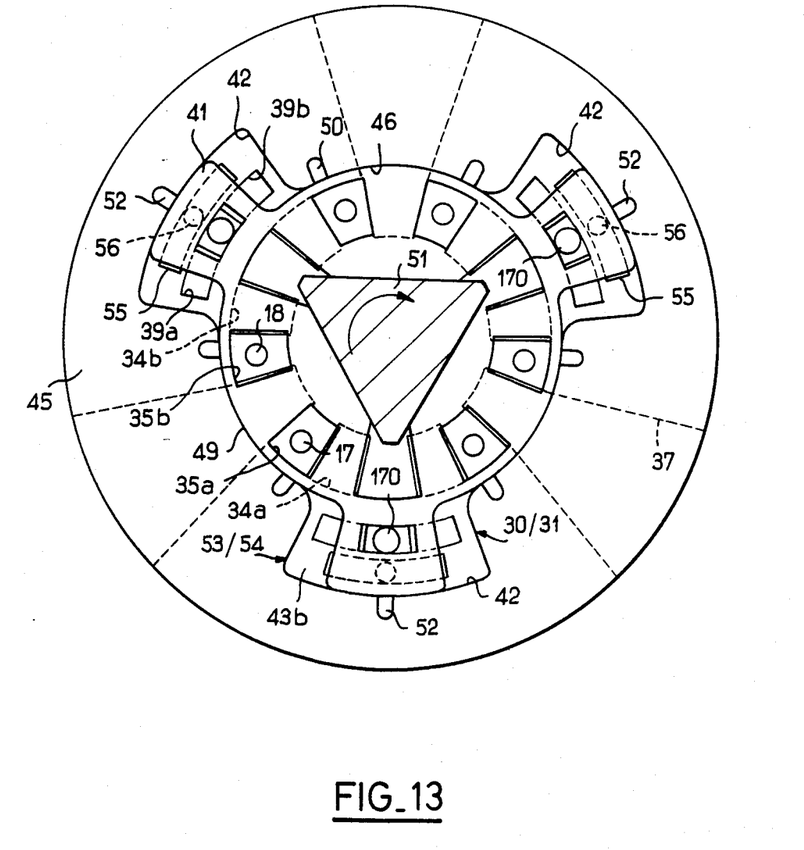
FIGS. 13 to 15 are front views of the practical embodiment of a distributor in accordance with FIGS. 10 to 12, with the front cover removed, and drawn in the positions corresponding to these Figures.
Figure 14:
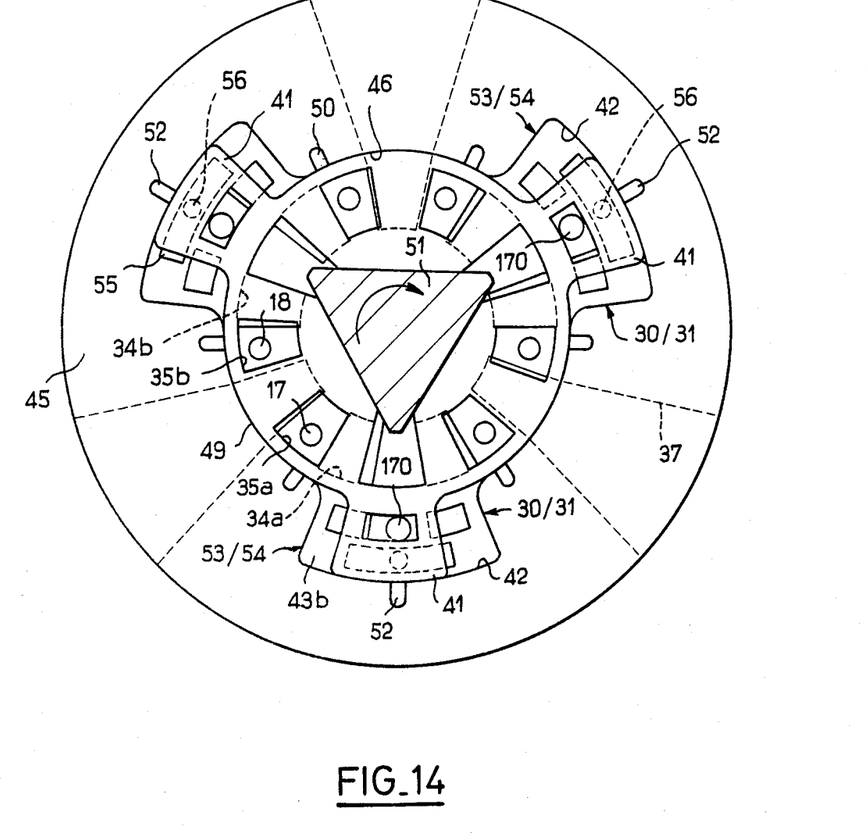
Figure 15:
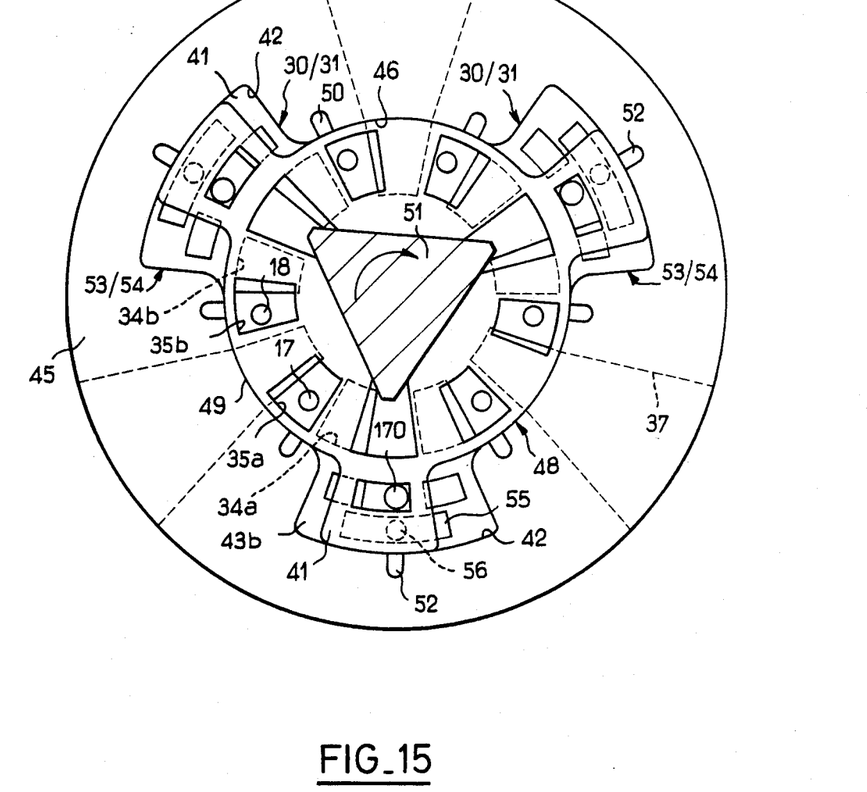

FIGS. 10 and 13, in which common components are indicated by the same reference numbers as in the previous FIGS. 3 and 6, show a distributor constructed according to the diagram in FIG. 2.

In this variant the drain conduits 40, which started from the reaction cavities 39a and 39b, have been eliminated, and a third group of valves designated by the general reference number 9 has, however, been provided, incorporating the stator portion 53 and the rotor portion 54. This group consists, in the case shown in FIGS. 10 and 13, of a radial extension of the reaction arm 41 and of the reaction cavity 42. As may be seen, the stator portion 53 incorporates an additional cavity 55 parallel to the reaction cavities 39a and 39b, radially offset outwards from the latter, and which overlaps very slightly the adjacent (outer) portion of the reaction arm 41 and from which branches a conduit 56 terminating at the drain 15. The seals 52 are here advantageously mounted in the stator ring 45. The outer portion of the arm 41 is itself provided laterally with two wide rectangular steps 7 and 7' facing the ends of the cavity 55, whose dimensions enable a predetermined restriction to be formed equivalent to that of the calibrated passages 6 and 6', from the moment when the rotor movement displaces the arm 41 from its central rest position shown in FIGS. 10 and 13 so as to bring the restrictions 7 and 7' into operation.

The operation in this case is essentially identical to that described above, given that the steps 7 and 7' perform the same function, in this case selective, as the fixed restrictions 6 and 6'.

The minor details and the construction characteristics used for putting the invention into practice are independent of the latter. All the remainder are included in the scope of the following claims.

I claim:

1. A hydraulic distributor for a servomechanism, more particularly for a power-assisted steering system of an automotive vehicle, comprising a primary member and a secondary member defining mutually distribution valve means selectively modulable upon a limited relative displacement of said primary and secondary members on both sides of a central position, said primary member being connected to an input actuating member and to a reaction device hydraulically actuated by externally modulatable reaction pressures, said secondary member being connected to a driven mechanism coupled to a hydraulic assistance device controlled by the distribution valve means, characterized in that the reaction device has a fluid inlet connected to an independent fluid flow circuit and the reaction device has OR logic function valve means actuated by said primary member to which said OR logic function valve means is coupled, the OR logic function valve means incorporated within the distributor and becoming operative before the distribution valve means of the distributor becomes operative, the OR logic function valve means formed by pairs of opposed cooperating edges defined, firstly, by two first cavities spaced from one another in a direction of relative displacement between the primary and secondary members, the first cavities formed in one of said primary and secondary members and communicating respectively with the fluid inlet of said reaction device, and secondly, by a third cavity formed in the other of said primary and secondary members, between said two first cavities and permanently communicating via the fluid inlet with a source of reaction pressure, said cooperating edges distinct from said distribution valve means.

2. The distributor according to claim 1, characterized in that each of the first cavities communicates with a corresponding reaction chamber of the reaction device, the reaction chambers incorporated within the distributor.

3. The distributor according to claim 2, characterized in that the reaction chambers are each in fluid communication with a drain via reaction restrictions formed in the distributor.

4. The distributor according to claim 3, characterized in that the reaction restrictions comprise calibrated passages formed in said one of said primary and secondary members of said distributor.

5. The distributor according to claim 3, characterized in that the reaction restrictions are variable as a function of relative displacement between said primary and secondary members.

6. The distributor according to claim 3, characterized in that the primary member is a star-shaped rotor having outwardly extending arms rotatably housed in a disc-shaped cavity of the secondary member.

7. The distributor according to claim 6, characterized in that the reaction device comprises at least one arm of said star-shaped rotor defining in said cavity the reaction chambers which are opposed from one another, said reaction restrictions being formed by a cooperating opposed pair of edges of said arm of the rotor and of a fourth cavity formed on a complementary inner surface of said secondary member, the fourth cavity in registration with said arm in said central position of the distributor.

8. The distributor according to claim 7, characterized in that one of the edges forming said reaction restrictions is shaped so as to form a rectangular step which is inoperative in said central position, and which, when brought into operation away from said central position, creates a fluid flow passage of constant predetermined cross-section.

9. The distributor according to claim 8, characterized by an externally modulable restriction between said source of reaction pressure and said third cavity of said OR logic function valve means.

* * * * *